US009460038B2

(12) United States Patent
Gaskins (10) Patent No.: US 9,460,038 B2
(45) Date of Patent: Oct. 4, 2016

(54) MULTI-CORE MICROPROCESSOR INTERNAL BYPASS BUS

(75) Inventor: Darius D. Gaskins, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 663 days.

(21) Appl. No.: 13/299,014

(22) Filed: Nov. 17, 2011

(65) Prior Publication Data

US 2012/0239847 A1 Sep. 20, 2012

Related U.S. Application Data

(60) Provisional application No. 61/426,470, filed on Dec. 22, 2010.

(51) Int. Cl.
 *G06F 13/14* (2006.01)
 *G06F 15/76* (2006.01)
 *G06F 13/40* (2006.01)

(52) U.S. Cl.
 CPC ........... *G06F 13/4022* (2013.01); *G06F 13/14* (2013.01); *G06F 15/76* (2013.01)

(58) Field of Classification Search
 CPC ....... G06F 13/42; G06F 13/14; G06F 15/167
 USPC ................ 710/105, 305, 316; 709/213, 216; 712/28
 See application file for complete search history.

(56) References Cited

U.S. PATENT DOCUMENTS

| 4,748,559 | A |   | 5/1988  | Smith et al. |         |
|-----------|---|---|---------|--------------|---------|
| 5,467,455 | A | * | 11/1995 | Gay et al.   | 710/100 |
| 5,485,625 | A |   | 1/1996  | Gumkowski    |         |
| 5,546,588 | A |   | 8/1996  | Deems et al. |         |
| 5,587,987 | A |   | 12/1996 | Okabe        |         |
| 5,918,061 | A |   | 6/1999  | Nikjou       |         |

(Continued)

FOREIGN PATENT DOCUMENTS

| CN | 101111814 | 1/2008  |
|----|-----------|---------|
| CN | 101901177 | 12/2010 |

OTHER PUBLICATIONS

Satori, John et al. "Distributed Peak power Management for Many-core Architectures." Published in Design, Automation & Test in Europe Conference & Exhibition, Apr. 2009, pp. 1556-1559.

(Continued)

*Primary Examiner* — Khanh Dang
(74) *Attorney, Agent, or Firm* — E. Alan Davis; Eric W. Cernyar; James W. Huffman (57) ABSTRACT

Microprocessors with multi-core dies that include bypass buses are provided. Each microprocessor comprises a plurality of physical pins for coupling the microprocessor to a processor bus coupled to a chipset. The multi-core die has at least two complementary sets of one or more processing cores, each providing a bus interface coupling respective core inputs and outputs to corresponding processor bus lines. A bypass bus on the die enables cores of the complementary sets to bypass the processor bus and communicate directly with each other. The bypass bus does not carry signals off the die, drive signals on the processor bus to the chipset, or receive chipset-drive signals from the processor bus. Moreover, the microprocessor is operable to detect whether the chipset or a complementary core is driving the processor bus, and if the latter, to select the higher quality bypass bus signals over the corresponding processor bus signals.

22 Claims, 8 Drawing Sheets

(56) References Cited

U.S. PATENT DOCUMENTS

| | | | |
|---|---|---|---|
| 5,987,614 A | 11/1999 | Mitchell et al. | |
| 6,496,880 B1* | 12/2002 | Ma et al. | 710/38 |
| 6,665,802 B1 | 12/2003 | Ober | |
| 6,968,467 B2 | 11/2005 | Inoue et al. | |
| 7,257,679 B2 | 8/2007 | Clark | |
| 7,308,558 B2* | 12/2007 | Arimilli et al. | 712/11 |
| 7,358,758 B2* | 4/2008 | Gaskins et al. | 326/30 |
| 7,451,333 B2 | 11/2008 | Naveh et al. | |
| 7,467,294 B2 | 12/2008 | Matsuoka et al. | |
| 8,024,591 B2 | 9/2011 | Bertelsen et al. | |
| 8,046,615 B2 | 10/2011 | Taguchi et al. | |
| 8,103,816 B2* | 1/2012 | Tiruvallur et al. | 710/268 |
| 8,214,632 B2 | 7/2012 | Choi et al. | |
| 8,358,651 B1* | 1/2013 | Kadosh et al. | 370/360 |
| 8,359,436 B2 | 1/2013 | Vash et al. | |
| 2003/0202530 A1 | 10/2003 | Jenkins et al. | |
| 2004/0019827 A1* | 1/2004 | Rohfleisch et al. | 714/29 |
| 2004/0117510 A1* | 6/2004 | Arimilli et al. | 709/253 |
| 2005/0138249 A1* | 6/2005 | Galbraith et al. | 710/100 |
| 2006/0171244 A1* | 8/2006 | Ando | 365/233 |
| 2006/0224809 A1* | 10/2006 | Gelke et al. | 710/305 |
| 2006/0282692 A1 | 12/2006 | Oh | |
| 2007/0070673 A1 | 3/2007 | Borkar et al. | |
| 2007/0143514 A1 | 6/2007 | Kaushik et al. | |
| 2007/0266262 A1 | 11/2007 | Burton et al. | |
| 2008/0129274 A1 | 6/2008 | Komaki | |
| 2009/0013217 A1* | 1/2009 | Shibata et al. | 714/47 |
| 2009/0083516 A1* | 3/2009 | Saleem et al. | 712/28 |
| 2009/0094481 A1 | 4/2009 | Vera et al. | |
| 2009/0172423 A1 | 7/2009 | Song et al. | |
| 2009/0222654 A1* | 9/2009 | Hum et al. | 713/100 |
| 2009/0233239 A1 | 9/2009 | Temchenko et al. | |
| 2009/0240973 A1 | 9/2009 | Muraki | |
| 2009/0307408 A1* | 12/2009 | Naylor | 710/317 |
| 2009/0319705 A1* | 12/2009 | Foong et al. | 710/100 |
| 2010/0026352 A1 | 2/2010 | Jacobowitz et al. | |
| 2010/0058078 A1 | 3/2010 | Branover et al. | |
| 2010/0138683 A1 | 6/2010 | Burton et al. | |
| 2010/0235672 A1 | 9/2010 | Zhang et al. | |
| 2010/0250821 A1* | 9/2010 | Mueller | 710/313 |
| 2010/0325481 A1* | 12/2010 | Dahan et al. | 714/10 |
| 2010/0332869 A1* | 12/2010 | Hsin et al. | 713/320 |
| 2011/0119672 A1 | 5/2011 | Ramaraju et al. | |
| 2011/0153984 A1 | 6/2011 | Wolfe et al. | |
| 2011/0185125 A1* | 7/2011 | Jain et al. | 711/122 |
| 2011/0265090 A1 | 10/2011 | Moyer et al. | |
| 2011/0271126 A1* | 11/2011 | Hill | 713/320 |
| 2011/0295543 A1* | 12/2011 | Fox et al. | 702/118 |
| 2012/0005514 A1 | 1/2012 | Henry et al. | |
| 2012/0023355 A1 | 1/2012 | Song et al. | |
| 2012/0079290 A1 | 3/2012 | Kumar et al. | |
| 2012/0124264 A1* | 5/2012 | Tiruvallur et al. | 710/260 |
| 2012/0161328 A1 | 6/2012 | Henry et al. | |
| 2012/0166763 A1 | 6/2012 | Henry et al. | |
| 2012/0166764 A1 | 6/2012 | Henry et al. | |
| 2012/0166832 A1 | 6/2012 | Gaskins et al. | |
| 2012/0166837 A1 | 6/2012 | Henry et al. | |
| 2012/0166845 A1 | 6/2012 | Henry et al. | |

OTHER PUBLICATIONS

"Intel® Core™ 2 Extreme Quad-Core Mobile Processor and Intel® Core™ 2 Quad Mobile Processor on 45-nm Process." Datasheet. For platforms based on Mobile Intel® 4 Series Express Chipset Family. Jan. 2009 Document No. 320390-002 pp. 1-72.

"Intel® Atom™ Processor 330$^\Delta$ Series." Datasheet. For systems based on Nettop Platform for '08. Revision 002. Feb. 2009. Document No. 320528-002. pp. 1-50.

"Intel® Core™ 2 Duo Processors and Intel® Core™ 2 Extreme Processors for Platforms Based on Mobile Intel® 965 Express Chipset Family." Datasheet. Jan. 2008. Document No. 316745-005. pp. 1-87.

"Intel® Core™ Duo Processor and Intel® Core™ Solo Processor on 65 nm Processs." Datasheet. Jan. 2007. Document No. 309221-006. pp. 1-91.

Richard, Michael Graham. "Intel's Next CPU to Include Dedicated 'Power Control Unit' to Save Power." Aug. 22, 2008. Downloaded from http://www.treehugger.com/files/2008/08/intel-cpu-processor-nehalem-i7-power-pcu.php on Jul. 14, 2010. pp. 1-4.

Naveh, Alon et al. "Power and Thermal Management in Intel® Core™ Duo Processor." Intel® Technology Journal. vol. 10, Issue 02, Published May 15, 2006. ISSN 1535-864X pp. 109-123.

Glaskowsky, Peter. "Investigating Intel's Lynnfield Mysteries." Mcall.com, CNET News, Speeds and Feeds. Sep. 21, 2009. Downloaded from http://mcall.com/com/8301-13512_3-10357328-23.html?tag=mncol;txt downloaded on Jul. 14, 2010. pp. 1-4.

Wasson, Scott. "Intel's Core i7 Processors; Nehalem Arrives with a Splash." The Tech Report. Nov. 3, 2008. Downloaded from http://techreport.com/articles.x/15818/1 on Jul. 14, 2010. pp. 1-11.

"Intel® QuickPath Architecture; A New System Architecture." White Paper Document No. 319725-001US. Mar. 2008 pp. 1-6.

Becker, Jürgen et al. "Digital On-Demand Computing Organism for Real-Time Systems." Workshop Proceedings ARCS'06. Jan. 1, 2006, pp. 230-245. Retrieved on Apr. 29, 2016 from: http://citeseerx.ist.psu.edu/viewdoc/download?doi=10.1.1.86.6350&rep=rep1&type=pdf.

Zeppenfeld, Johannes et al. "Automatic Workload Management for Multi-core Processor Systems." Feb. 22, 2010. Architecture of Computing Systems—ARCS 2010. pp. 49-60.

\* cited by examiner

MULTI-CORE MICROPROCESSOR INTERNAL BYPASS BUS

CROSS REFERENCE TO RELATED APPLICATION(S)

This application claims priority based on U.S. Provisional Application Ser. No. 61/426,470, filed Dec. 22, 2010, entitled MULTI-CORE INTERNAL BYPASS BUS, which is hereby incorporated by reference in its entirety.

This application is related to the following co-pending U.S. Patent Applications which are concurrently filed herewith, each of which is hereby incorporated by reference in its entirety.

| Ser. No. | Filing Date | Title |
| --- | --- | --- |
| 13/299,059 | Nov. 17, 2011 | POWER STATE SYNCHRONIZATION IN A MULTI-CORE PROCESSOR |
| 13/299,122 | Nov. 17, 2011 | DECENTRALIZED POWER MANAGEMENT DISTRIBUTED AMONG MULTIPLE PROCESSOR CORES |
| 13/299,171 | Nov. 17, 2011 | RETICLE SET MODIFICATION TO PRODUCE MULTI-CORE DIES |
| 13/299,207 | Nov. 17, 2011 | DYNAMIC MULTI-CORE MICROPROCESSOR CONFIGURATION DISCOVERY |
| 13/299,225 | Nov. 17, 2011 | DISTRIBUTED MANAGEMENT OF A SHARED POWER SOURCE TO A MULTI-CORE MICROPROCESSOR |
| 13/299,239 | Nov. 17, 2011 | DYNAMIC AND SELECTIVE CORE DISABLEMENT AND RECONFIGURATION IN A MULTI-CORE PROCESSOR |

FIELD OF THE INVENTION

The present invention relates in general to the field of multi-core microprocessors, and particularly to signal quality on a bus shared by the multiple cores.

BACKGROUND OF THE INVENTION

The present inventors have observed poor signal quality to the point of system unreliability, on signals received by one core of a multi-core microprocessor from a processor bus shared with a chipset by all the cores of the multi-core microprocessor when one of the other cores drives the processor bus, as described in more detail below with respect to FIGS. 1 and 2. Therefore, a solution to the problem is needed.

BRIEF SUMMARY OF INVENTION

In one aspect, the present invention provides a microprocessor with a multi-core die. The die provides two or more cores whose output signals are coupled to physical pads of the die. The die is mounted on a package that couples the pads of the die (and potentially other dies) to physical pins on the package. The physical pins of the package couple the package to a processor bus, which processor bus is in turn coupled to a chipset.

The die provides a bypass bus that enables complementary processing cores, or complementary twin core pairs, of the multi-core die to bypass the processor bus in order to communicate directly with each other. As used herein, "complementary" refers to cores or twin core pairs of a die that are coupled by a bypass bus. The bypass bus comprises wire nets disposed on the die and configured to convey a plurality of output signals from each core or twin core pair to corresponding inputs of its complementary core or twin core pair. The bypass bus is not connected to, and is separated by intermediate bus interface logic from, the physical pads of the die or the physical pins of the multi-core microprocessor. Therefore, the bypass bus does not carry signals off the die or to or from the processor bus. Moreover, the bypass bus lines are shielded by the intermediate bus interface logic from noise carried on the corresponding processor bus line. When the first core drives values on the processor bus to the chipset, the bus interface of the second core causes the second core to observe the values driven by the first core directly from the bypass bus rather than from the processor bus. When the second core drives values on the processor bus to the chipset, the bus interface of the first core causes the first core to observe the values driven by the second core directly from the bypass bus rather than from the processor bus.

In another aspect, the bypass bus provides bypass lines for each of a plurality of corresponding processor bus lines. In a related further aspect, for each bypassable processor bus signal, a first unidirectional bypass bus line is provided going from a first core or twin core pair to a second, complementary core or twin core pair, and a second unidirectional bypass line is provided going from the second core or twin core pair to the first core or twin core pair.

In yet another aspect, each core includes bus interface circuitry to facilitate bypass bus communications through the bypass lines. For normal processor bus communications, each core is coupled to each of its corresponding processor bus lines to either drive an output signal to the processor bus line or to receive an input signal from the processor bus. To facilitate such bidirectional communications, the core's bus interface circuitry provides intermediate input and output bus line interface logic to couple each of the core's respective input and output signals to a corresponding one of the die's physical I/O landing pads.

In a related aspect, the intermediate output logic comprises a bus line interface transistor gated by the core's output signal line, or, in an embodiment in which twin cores share a set of the die's physical I/O landing pads, by a Boolean operation (such as OR) on the twin cores' respective output signal lines (herein also referred to as a twin core pair output signal line). The intermediate input logic comprises a bus line interface multiplexer that receives, among its selectable inputs, a chipset-driven signal on the corresponding processor bus line and a corresponding output signal of the same core or same twin core pair.

In another related aspect, the bypass bus couples the complementary cores or twin core pairs together with wires or traces that are, on their respective ends, coupled between a core's or twin core pair's relevant output or input signal line and the intermediate bus line interface logic coupling the relevant output or input signal line to a corresponding physical I/O landing pad. In a further aspect, each bypass bus line is connected, on its input end, to the gate of the corresponding bus line interface transistor, and on its output end, to an additional input of the corresponding bus line interface multiplexer. The transistor and multiplexer buffer the input and output, respectively, of the bypass bus line from the corresponding processor bus line.

In yet another aspect, a method of inter-core communication among cores of a multi-core die is provided. A bus interface of a core or twin core pair receives signals from both a processor bus connecting the multi-core die to a chipset and a corresponding bypass bus connecting the core or twin core pair to a complementary, bypass-bus-connected core or twin core pair of the multi-core die. The bypass bus does not carry signals off the die, drive signals on the processor bus to the chipset, or receive chipset-driven signals from the processor bus. The core, or one of the cores of a twin core pair, detects whether the chipset or a complementary core or core of a complementary twin core pair is driving the processor bus. If the complementary core or core of a complementary twin core pair is driving the processor bus, then the bus interface selects signals from the bypass bus instead of signals from the processor bus to drive corresponding core inputs. When the first set of die cores drives values on the processor bus to the chipset, the bus interfaces cause the second set of die cores to observe the values driven by the first set of die cores directly from the bypass bus rather than from the processor bus. When the second set of die cores drives values on the processor bus to the chipset, the bus interfaces cause the first set of die cores to observe the values driven by the second set of die cores directly from the bypass bus rather than from the processor bus.

In a still further aspect, each complementary core or twin core pair on a multi-core semiconductor die comprises a plurality of intermediate input logic multiplexers. Each intermediate input logic multiplexer receives a control input and a plurality of selectable inputs and provides an output. A first selectable input is coupled to a corresponding one of the plurality of physical pads of the core, which is coupled to the processor bus. A second selectable input is coupled to a corresponding output of the core, or, if the core has a twin, a Boolean operation on the corresponding outputs of the core and its twin. A third selectable input is coupled to a corresponding bypass bus line that transfers an output signal from the complementary core or twin core pair. The multiplexer conveys as its output a selected one of the plurality of selectable inputs to the core. The control input is configured to cause the multiplexer to select, for provision as its output, the first input when the chipset is driving the processor, the second input when the core or its twin, if any, is driving the processor bus, and the third input when the complementary core, or one of the cores of the complementary twin core pair, is driving the processor bus. The multiplexer output is coupled, and delivers its signal to, the respective input signal line(s) of the (twin) core(s).

Furthermore, each core or twin core pair comprises a plurality of intermediate output logic transistors. Each intermediate output logic transistor has a gate, a source, and a drain. The source is coupled to ground and the drain is coupled to a corresponding one of the physical I/O landing pads of the core or twin core pair. The gate is coupled to and driven by the core's output signal line, or, in a twin-core embodiment, by a Boolean operation (such as OR) on the twin cores' respective output signal lines. The gate is also coupled to the second selectable input of the core's (or twin cores') corresponding intermediate output logic multiplexer, and, via a bypass bus line, to the third selectable input of the complementary core or twin core pair.

DETAILED DESCRIPTION OF THE INVENTION

To address the poor signal quality problems in multi-core microprocessors such as those mentioned above, the present inventors have provided internal a bypass bus between two cores of a dual-core microprocessor die according to one embodiment, and between four cores of a quad-core microprocessor die according to another embodiment. However, first a conventional system having a conventional dual-core microprocessor will be described, so that embodiments of the invention may be more clearly understood.

Figure 1:
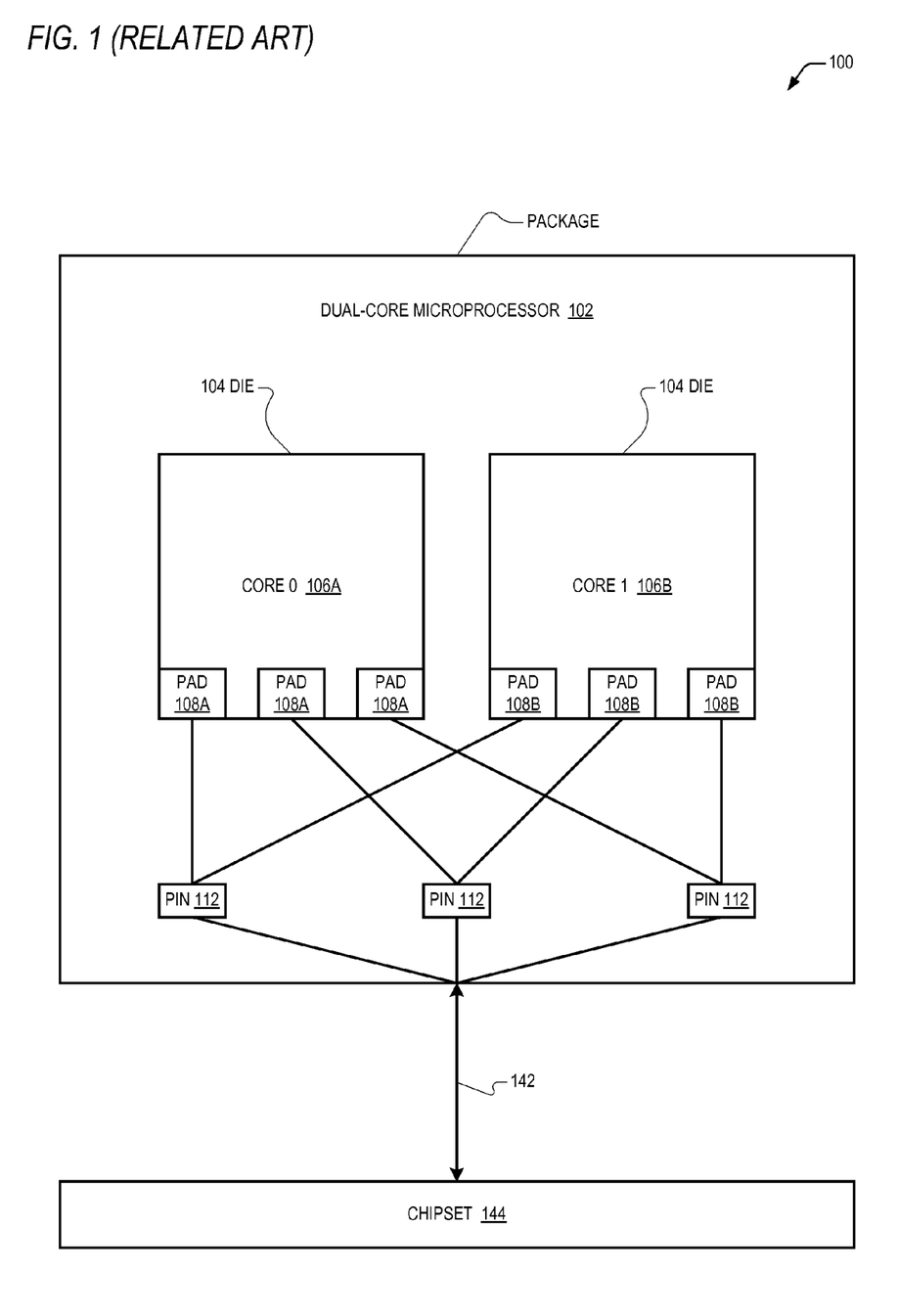
FIG. 1 is a block diagram illustrating a system that includes a conventional dual-core microprocessor package.

Referring now to FIG. 1, a block diagram illustrating a system 100 that includes a conventional dual-core microprocessor package 102 is shown. The system 100 includes the dual-core microprocessor package 102 coupled to a chipset 144 by a processor bus 142. The dual-core microprocessor 102 includes two processing cores referred to collectively as cores 106 and generically as core 106 and individually as core 0 106A and core 1 106B. The chipset 144 includes well-known circuits such as a memory controller for controlling a system memory, and bus bridges for bridging the processor bus 142 to peripheral buses such as ISA, PCI, PCI-Express, and the like.

Each of the cores 106 includes blocks for executing instructions of a stored program such as an instruction fetch unit, an instruction decode unit, general-purpose and specific-purpose registers, address generation units, cache memories, execution units, a retire unit, and a bus interface unit for interfacing to the processor bus 142. The cores 106 may have various combinations of microarchitectural features, such as in-order or out-of-order execution, scalar or superscalar, CISC or RISC.

Each of the cores 106 resides on its own separate semiconductor die 104, as shown. The two dies 104 of the dual-core microprocessor 102 are included in a single package 102, as shown. Each core 106 includes physical pads 108 that carry signals from internal circuits of the core 106 to and from the processor bus 142. The physical pads of core 0 106A are denoted pads 108A, and the physical pads of core 1 106B are denoted pads 108B. The package 102 includes a substrate upon which the dies 104 reside and which includes interconnects between the pads 108 of the cores 106 and the pins 112 of the package 102 that connect the package 102 to other components of the system 100, such as to the chipset 144 via a motherboard. Although the pads 108 are shown only along one side of the dies 104, they typically reside on more than one side of the die 104; furthermore, although each die 104 is shown with only three pads 108, typically each die 104 includes hundreds of pads 108. As shown, corresponding pads 108A/108B of the two dies 104 are connected to the same pin 112 since the package 102 has a single set of pins 112 that connect them to the processor bus 142; that is, the two cores 106 are both coupled to and share the single set of pins 112 that connect the package 102 to the processor bus 142.

Figure 2:
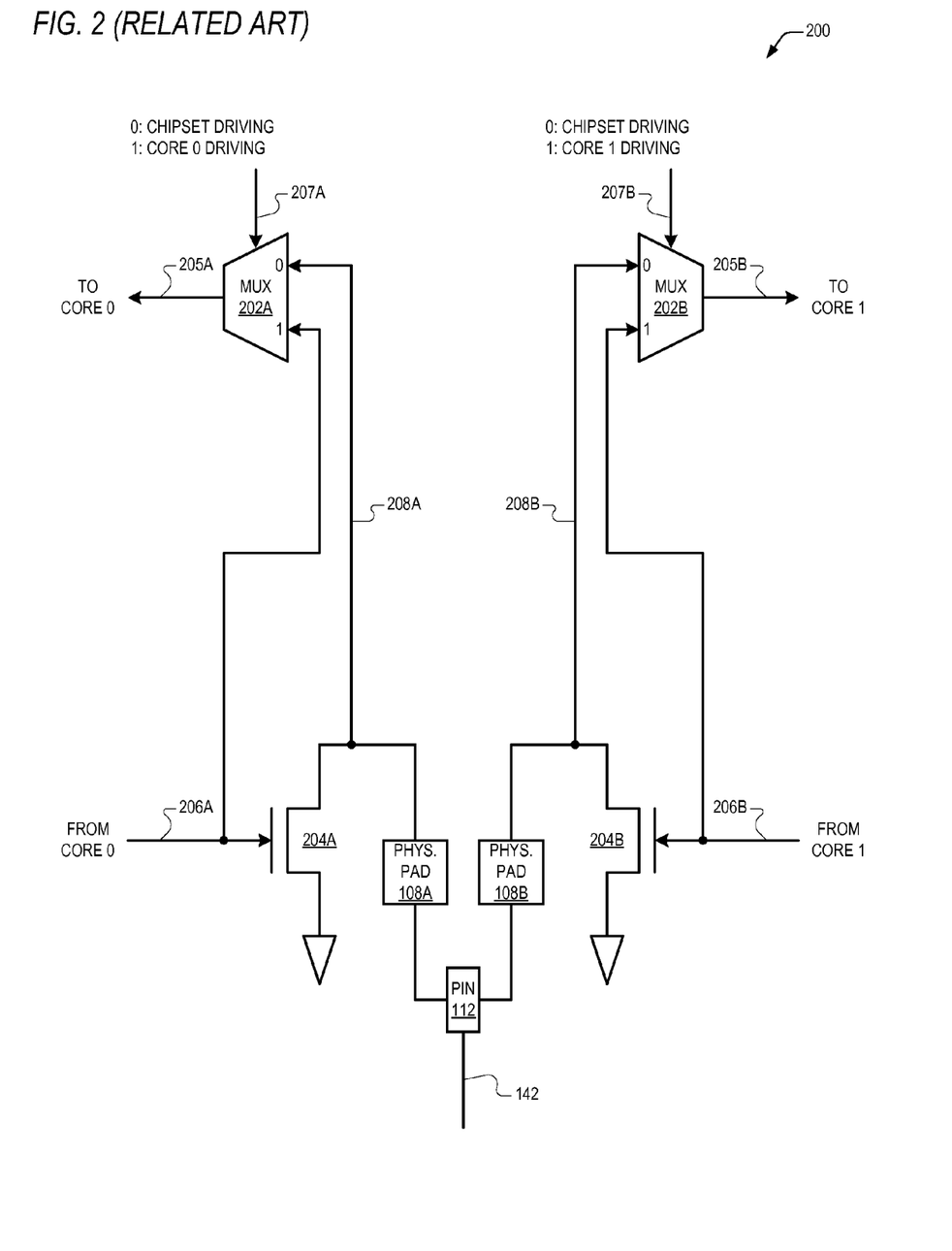
FIG. 2 is a block diagram illustrating bus interface circuitry of the conventional dual-core microprocessor of FIG. 1.

Referring now to FIG. 2, a block diagram illustrating bus interface circuitry 200 of the conventional dual-core microprocessor 102 of FIG. 1 is shown. The bus interface circuitry 200 includes a physical pad 108A coupled to a pin 112 of the external processor bus 142. The physical pad 108A is simply a physical location for attaching a bonding wire or the like to the package 102 pin 112; that is, the physical pad 108A does not include any active electronic device. The physical pad 108A is also coupled to a signal 208A which is coupled to the drain of a transistor 204A whose source is coupled to ground. The transistor 204A is configured to receive on its gate input an output signal 206A from core 0 106A. The output signal 206A may be a data signal, an address signal, or a control signal for providing a value to be driven onto a corresponding signal of the processor bus 142 via signal 208A and physical pad 108A. Thus, although FIG. 2 only shows the arrangement for a single signal of the processor bus 142, the elements shown in FIG. 2 may exist for each signal of the processor bus 142. The bus interface circuitry 200 also includes a 2-input mux 202A. The mux 202A receives signal 208A on its input denoted input 0 and receives signal 206A on its input denoted input 1. The output of the mux 202A is provided as an input signal 205A to core 0 106A. The input signal 205A may be a data signal, an address signal, or a control signal corresponding to a signal of the processor bus 142. The input signal 205A may convey a value from another processing entity of the system 100, namely from core 1 106B or the chipset 144, via physical pad 108A and signal 208A. Additionally, the input signal 205A may convey a value from core 0 106A itself via signal 206A for functions such as snooping its own cache memories. A select signal 207A controls mux 202A to select its inputs to provide on output 205A as indicated in Table 1 below.

TABLE 1

| entity driving processor bus | input selected |
|---|---|
| chipset | 0 (signal 208A from external processor bus 142) |
| core 0 | 1 (signal 206A from core 0) |
| core 1 | 0 (signal 208A from external processor bus 142) |

The bus interface circuitry 200 also includes a physical pad 108B coupled to a pin 112 of the external processor bus 142. The physical pad 108B is also coupled to a signal 208B which is coupled to the drain of a transistor 204B whose source is coupled to ground. The transistor 204B is configured to receive on its gate input an output signal 206B from core 1 106B. The output signal 206B may be a data signal, an address signal, or a control signal for providing a value to be driven onto a corresponding signal of the processor bus 142 via signal 208B and physical pad 108B. The bus interface circuitry 200 also includes a 2-input mux 202B. The mux 202B receives signal 208B on its input denoted input 0 and receives signal 206B on its input denoted input 1. The output of the mux 202B is provided as an input signal 205B to core 1 106B. The input signal 205B may be a data signal, an address signal, or a control signal corresponding to a signal of the processor bus 142. The input signal 205B may convey a value from another processing entity of the system 100, namely from core 0 106A or the chipset 144, via physical pad 108B and signal 208B. Additionally, the input signal 205B may convey a value from core 1 106B itself via signal 206B for functions such as snooping its own cache memories. A select signal 207B controls mux 202B to select its inputs to provide on output 205B as indicated in Table 2 below.

TABLE 2

| entity driving processor bus | input selected |
|---|---|
| chipset | 0 (signal 208B from external processor bus 142) |
| core 0 | 0 (signal 208B from external processor bus 142) |
| core 1 | 1 (signal 206B from core 0) |

Although not shown, a terminating resistor may be coupled to each of the physical pads 108A/108B. Fuses may be coupled between the terminating resistors and their power source. The fuses may be selectively blown or retained during manufacture of the microprocessor in order to selectively couple the terminating resistors to the physical pads 108A/108B.

The present inventors have observed poor signal quality on signal 208A when core 1 106B drives the processor bus 142 and vice versa on signal 208B when core 0 106A drives the processor bus 142 to the point of system unreliability. Therefore, a solution to this problem is needed.

Figure 3:
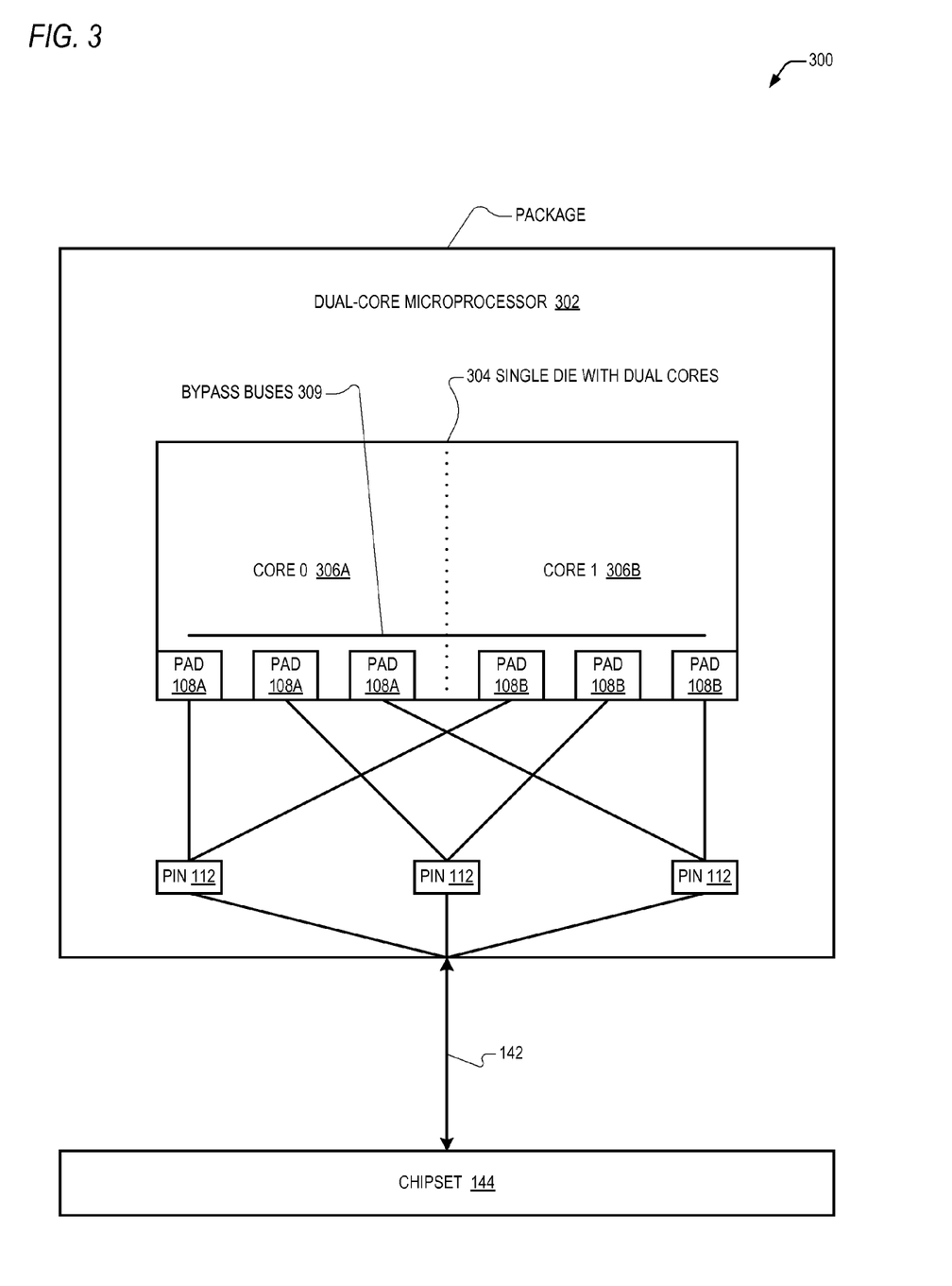
FIG. 3 is a block diagram illustrating a system that includes a dual-core microprocessor package according to the present invention.

Referring now to FIG. 3, a block diagram illustrating a system 300 that includes a dual-core microprocessor package 302 according to the present invention is shown. The system 300 includes a chipset 144 and processor bus 142 similar to those of FIG. 1. The system 300 also includes the dual-core microprocessor package 302 coupled to the chipset 144 by the processor bus 142. The dual-core microprocessor 302 includes two processing cores referred to collectively as cores 306 and generically as core 306 and individually as core 0 306A and core 1 306B.

Each of the cores 306 is similar to the cores 106 of FIG. 1; however, the cores 306 of FIG. 3 are modified as follows. Unlike the cores 106 of the dual-core microprocessor 102 of FIG. 1, both of the cores 306 of the dual-core microprocessor 302 of FIG. 3 reside within a single semiconductor die 304 within the package 302, as shown. That is, the manufacturer of the dual-core microprocessor 302 of FIG. 3 manufactures a matrix of the dies 304 upon a semiconductor wafer and dices, or cuts, the dies 304 into single physical entities. That is, unlike the dual-core microprocessor 102 of FIG. 1 that is two physical dies 104 mounted on a package substrate and connected by signal traces on the substrate, the dual-core microprocessor 302 of FIG. 3 is a single physical die 304 having two cores 306A and 306B. On the other hand, like the dual-core microprocessor 102 of FIG. 1, each of the two cores 306A/306B of the dual-core microprocessor 302 includes a pad 108A/108B for each corresponding pin 112 of the processor bus 142, and the pad 108A/108B of each of the two cores 306A/306B is connected via a substrate trace to the corresponding pin 112, as shown in FIG. 3.

In one embodiment, the single-die 304 dual-core microprocessor 302 of FIG. 3 is designed and manufactured as described in the disclosure of the section of Ser. No. 61/426,470, filed Dec. 22, 2010, entitled "Reticle Set Modification to Produce Multi-Core Dies" (CNTR.2528), which is incorporated herein by reference. Briefly, according to the disclosure of CNTR.2528, the manufacturer designs a first reticle set used to print a set of single-core dies (such as the single-core dies 104 of FIG. 1). The first reticle set defines scribe lines to separate the single-core dies, and the scribe lines collectively define a seal ring that surrounds each single-core die. The manufacturer then modifies less than all the reticles of the first reticle set to produce a second reticle set that can be used to print a set of dual-core dies (such as the dual-core die 304 of FIG. 3). The manufacturer removes at least one scribe line of the first reticle set, and the modifies applicable corresponding portions of the first reticle set to define the bypass bus 309 (referred to as inter-core communication wires 212 in CNTR.2528). The manufacturer then manufactures the wafer using the second reticle set and cuts the dual-core dies 304 along the remaining scribe lines to produce the dual-core dies 304.

The bypass bus 309 connects two physically adjacent cores on the wafer that were previously designed to be separated by a scribe line, but which scribe line was replaced with the bypass bus 309 to enable the two connected cores to communicate during operation. Because cores 0 and 1 are connected by the bypass bus 309, they are described herein as being "complementary" to each other. The bypass bus 309 is not connected to the physical pads 108; hence, it does not carry signals off the dual-core die 304.

Figure 4:
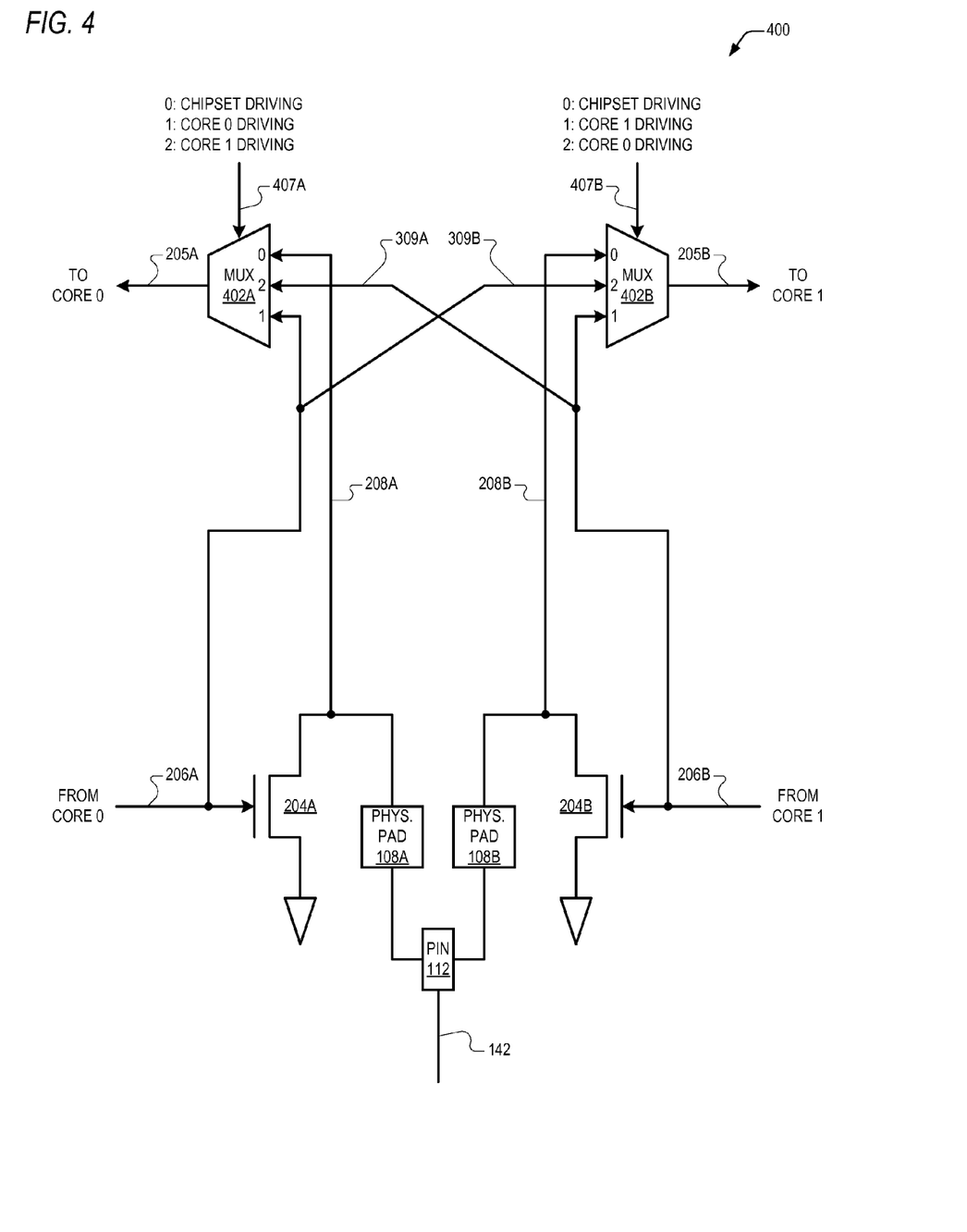
FIG. 4 is a block diagram illustrating bus interface circuitry of the dual-core microprocessor of FIG. 3 according to the present invention.

Referring now to FIG. 4, a block diagram illustrating bus interface circuitry 400 of the dual-core microprocessor 302 of FIG. 3 according to the present invention is shown. The bus interface circuitry 400 of the single die 304 is modified relative to the bus interface circuitry 200 of FIG. 2 to accommodate the bypass bus 309 and provide improved signal quality with respect to the processor bus 142 signals.

The bus interface circuitry 400 of FIG. 4 is similar in many respects to the bus interface circuitry 200 of FIG. 2, and elements with like numbers are similar. However, the following differences are described here.

In FIG. 4, the 2-input mux 202A of FIG. 2 is replaced with a 3-input mux 402A. The third input of mux 402A is denoted input 2 in FIG. 4 and is coupled to receive a bypass bus signal 309A that is coupled to signal 206B from core 1 306B. The select input to mux 402A is denoted 407A and operates to cause mux 402A to select its inputs as indicated in Table 3 below.

TABLE 3

| entity driving processor bus | input selected |
| --- | --- |
| chipset | 0 (signal 208A from external processor bus 142) |
| core 0 | 1 (signal 206A from itself, i.e., native core 0) |
| core 1 | 2 (bypass bus signal 309A from complementary core 1) |

Likewise, the 2-input mux 202B of FIG. 2 is replaced with a 3-input mux 402B. The third input of mux 402B is denoted input 2 in FIG. 4 and is coupled to receive a bypass bus signal 309B that is coupled to signal 206A from core 0 306A. The select input to mux 402B is denoted 407B and operates to cause mux 402B to select its inputs as indicated in Table 4 below.

TABLE 4

| entity driving processor bus | input selected |
| --- | --- |
| chipset | 0 (signal 208B from external processor bus 142) |
| core 0 | 2 (bypass bus signal 309B from complementary core 0) |
| core 1 | 1 (signal 206B from itself, i.e., native core 1) |

As may be observed from FIG. 4, advantageously, when core 0 306A drives the processor bus 142, core 1 306B may observe the values driven by core 0 306A directly from the internal bypass bus 309B rather than from the external processor bus 142 via signal 208B, which has much poorer signal quality than the internal bypass bus signals 309B; and, when core 1 306B drives the processor bus 142, core 0 306A may observe the values driven by core 1 306B directly from the internal bypass bus 309A rather than from the external processor bus 142 via signal 208A, which has much poorer signal quality than the internal bypass bus signals 309A.

Another advantage of the embodiment of FIGS. 3 and 4 is that it achieves a dual-core microprocessor with improved signal quality afforded by the internal bypass bus and yet avoids having to add additional physical pads to create the bypass bus between the two cores. This is a particular benefit in a design that is already pad-limited.

In one embodiment, the data and address signals on the processor bus 142 are double-clocked or quad-clocked signals relative to the control signals of the processor bus 142. The present inventors have observed poor signal quality on signal 208A when core 1 106B drives the processor bus 142 and vice versa on signal 208B when core 0 106A drives the processor bus 142, particularly for the double-clocked or quad-clocked data and address signals. However, the signal quality of the single-speed (i.e., the normal bus clock speed) control signals is more reliable, and the control logic within the bus interface circuitry 400 that generates the mux 402 select signals 407 is able to observe the single-speed processor bus 142 control signals in order to reliably determine which entity (i.e., core 0 306A, core 1 306B, or the chipset 144) is driving the processor bus 142.

Quad-Core Embodiment

Figure 5:
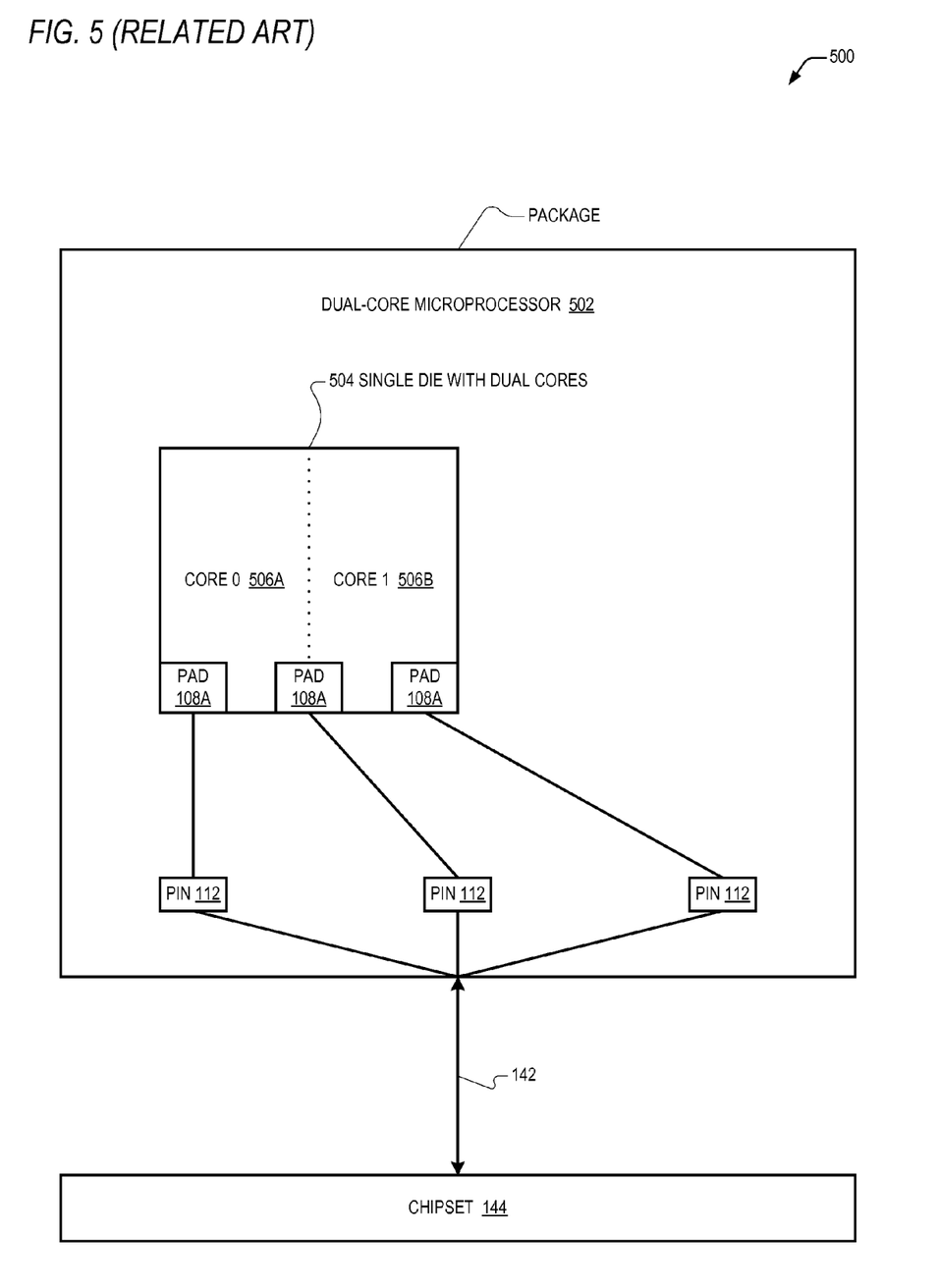
FIG. 5 is a block diagram illustrating a system that includes a conventional dual-core microprocessor package.

Referring now to FIG. 5, a block diagram illustrating a system 500 that includes a conventional dual-core microprocessor package 502 is shown. The system 500 is similar to the system of FIG. 3; however, the single-die 504 dual-core microprocessor 502 of FIG. 5 is different from the single-die 304 dual-core microprocessor 302 of FIG. 3 in that it only includes a single physical pad 108A for each corresponding pin 112 of the processor bus 142. That is, the two cores 506A and 506B of the dual-core microprocessor 502 of FIG. 5 share a set of physical pads 108A, rather than each having their own set of physical pads 108A and 108B like the dual-core microprocessor 302 of FIG. 3. Accordingly, cores 506A and 506B are referred to herein as twin cores, and collectively as a twin core pair. The single-die 504 dual-core microprocessor 502 of FIG. 5 may include a cache memory that is shared by the two cores 506.

Figure 6:
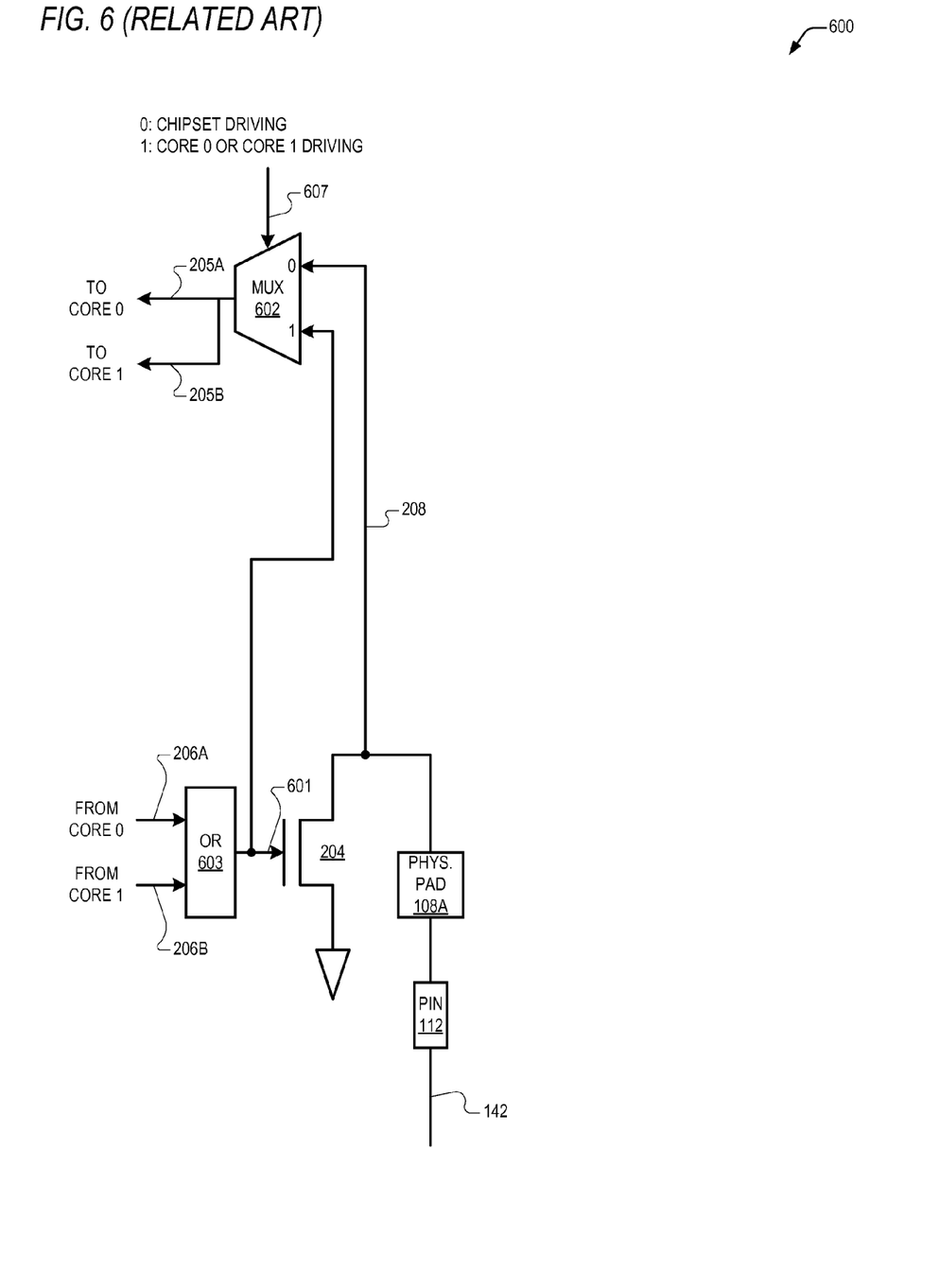
FIG. 6 is a block diagram illustrating bus interface circuitry of the conventional dual-core microprocessor of FIG. 5.

Referring now to FIG. 6, a block diagram illustrating bus interface circuitry 600 of the conventional dual-core microprocessor 502 of FIG. 5 is shown. The bus interface circuitry 600 includes a physical pad 108A coupled to a pin 112 of the external processor bus 142. The physical pad 108A is also coupled to signal 208 which is coupled to the drain of transistor 204 whose source is coupled to ground. The transistor 204 is configured to receive on its gate input an output 601 of a two-input OR gate 603. The OR gate 603 receives on its respective inputs signal 206A from core 0 106A and signal 206B from core 1 106B. When core 0 106A drives the processor bus 142, core 1 106B generates a false value on signal 206B so that core 0 106A can control the output 601 of the OR gate 603, transistor 204, and the output value on the pin 112 and processor bus 142; conversely, when core 1 106B drives the processor bus 142, core 0 106A generates a false value on signal 206A so that core 1 106B can control the output 601 of the OR gate 603, transistor 204, and the output value on the pin 112 and processor bus 142. Each of the output signals 206A and 206B may be a data signal, an address signal, or a control signal for providing a value to be driven onto a corresponding signal of the processor bus 142 via signal 208 and physical pad 108A. Thus, although FIG. 6 only shows the arrangement for a single signal of the processor bus 142, the elements shown in FIG. 6 exist for each signal of the processor bus 142.

The bus interface circuitry 600 also includes a 2-input mux 602. The mux 602 receives signal 208 on its input denoted input 0 and receives signal 601 on its input denoted input 1. The output of the mux 602 is provided as an input signal 205A to core 0 106A and as an input signal 205B to core 1 106B. The input signals 205A/205B may be a data signal, an address signal, or a control signal corresponding to a signal of the processor bus 142. The input signals 205A/205B may convey a value from another processing entity of the system 500, namely from the chipset 144, via physical pad 108A and signal 208. Additionally, the input signals 205A/205B may convey a value from core 1 106B via OR gate 603 and signal 601, or from core 0 106A itself via OR gate 603 and signal 601 for functions such as snooping its own cache memories. A select signal 207A controls mux 602 to select its inputs to provide on output 205A as indicated in Table 5 below.

TABLE 5

| entity driving processor bus | input selected |
|---|---|
| chipset | 0 (signal 208 from external processor bus 142) |
| core 0 | 1 (signal 601 from native twin core pair core 0) |
| core 1 | 1 (signal 601 from native twin core pair core 1) |

Figure 7:
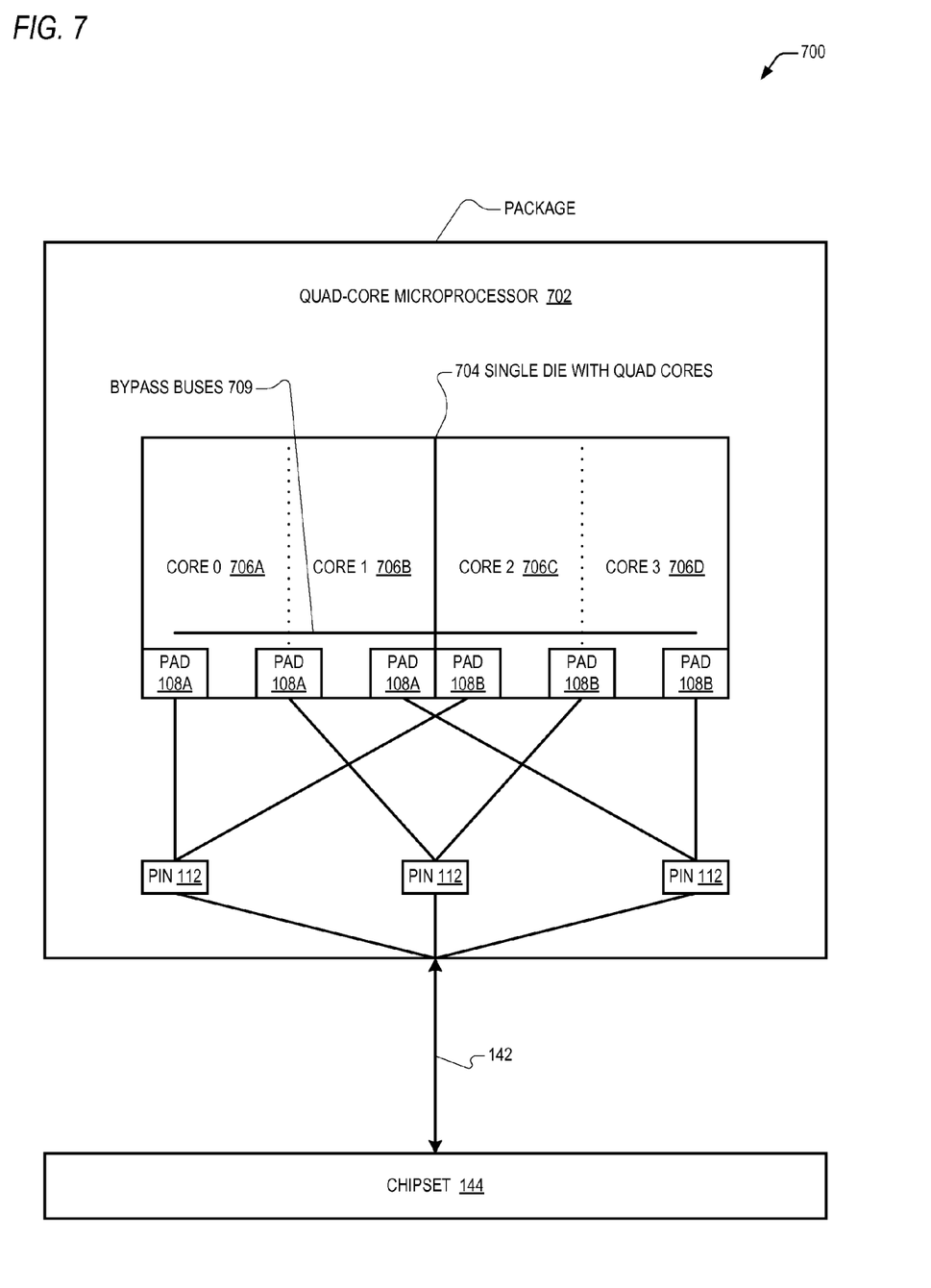
FIG. 7 is a block diagram illustrating a system that includes a quad-core microprocessor package according to the present invention.

Referring now to FIG. 7, a block diagram illustrating a system 700 that includes a quad-core microprocessor package 702 according to the present invention is shown. The system 700 includes a chipset 144 and processor bus 142 similar to those of FIG. 1. The system 700 also includes the quad-core microprocessor package 702 coupled to the chipset 144 by the processor bus 142. The quad-core microprocessor 702 includes four processing cores referred to collectively as cores 706 and generically as core 706 and individually as core 0 706A, core 1 706B, core 2 706C, and core 3 706D.

Core 0 706A and core 1 706B form a twin core pair that is similar to the twin core pair formed by core 0 506A and core 1 506B; in particular, core 0 706A and core 1 706B share a set of physical pads 108A that are coupled to corresponding processor bus 142 pins 112 via substrate traces. Likewise, core 2 706C and core 3 706D also form a twin core pair; in particular, core 2 706C and core 3 706D share a set of physical pads 108B that are coupled to corresponding processor bus 142 pins 112 via substrate traces. The four cores 706 of the quad-core microprocessor 702 all reside on a single die 704, as shown.

The manufacturer of the quad-core microprocessor 702 of FIG. 7 manufactures a matrix of the dies 704 upon a semiconductor wafer and dices, or cuts, the dies 704 into single physical entities. In one embodiment, the single-die 704 quad-core microprocessor 702 of FIG. 7 is designed and manufactured as described in CNTR.2528. That is, the manufacturer designs a first reticle set used to print a set of dual-core dies (such as the dual-core dies 504 of FIG. 5). The first reticle set defines scribe lines to separate the dual-core dies, and the scribe lines and collectively define a seal ring that surrounds each dual-core die. The manufacturer then modifies less than all the reticles of the first reticle set to produce a second reticle set that can be used to print a set of quad-core dies (such as the quad-core die 704 of FIG. 7) by replacing at least one scribe line of the first reticle set with the bypass bus 709. The bypass bus 709 comprises inter-core communication wires that connect two physically adjacent twin core pairs or dual-core sets on the wafer that were previously designed to be separated by the scribe line. But the scribe line was removed, and the reticle set modified to define the bypass bus 709, to enable the four cores to communicate thereby during operation. The manufacturer then manufactures the wafer using the second reticle set and cuts the quad-core dies 704 along the remaining scribe lines to produce the quad-core dies 704.

Because the twin core pair formed by cores 0 and 1 is connected by bypass bus 709 to the twin core pairs formed by cores 2 and 3, the twin core pair formed by cores 0 and 1 is described herein as "complementary" to the twin core pairs formed by cores 2 and 3. The bypass bus 709 is not connected to the physical pads 108; hence, it does not carry signals off the quad-core die 704.

Figure 8:
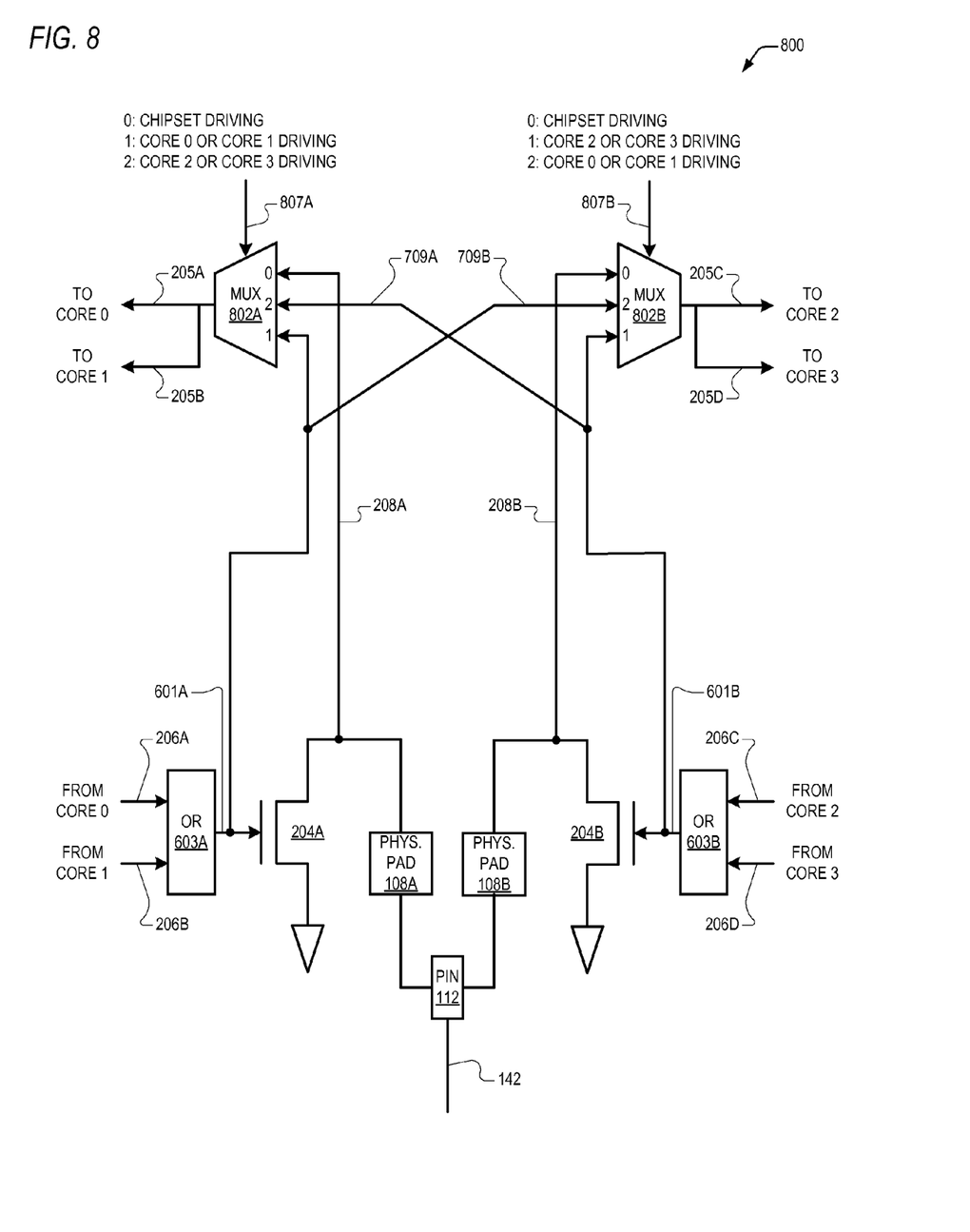
FIG. 8 is a block diagram illustrating bus interface circuitry of the quad-core microprocessor of FIG. 7 according to the present invention.

Referring now to FIG. 8, a block diagram illustrating bus interface circuitry 800 of the quad-core microprocessor 702 of FIG. 7 according to the present invention is shown. The bus interface circuitry 800 (of FIG. 8) of the single die 704 is modified relative to the bus interface circuitry 600 of FIG. 6 to accommodate the bypass bus 709 and provide improved signal quality with respect to the processor bus 142 signals.

The bus interface circuitry 800 of FIG. 8 is similar in many aspects to the bus interface circuitry 600 of FIG. 6, and in other aspects to the bus interface circuitry 400 of FIG. 4, with like numbering used where appropriate. The following differences are described here. The OR gate 603 of FIG. 6 is referred to as OR gate 603A; and signal 601 is referred to as 601A. The signal 208 of FIG. 6 is referred to as 208A (as shown in FIG. 4). The transistor 204 of FIG. 6 is referred to as 204A (as shown in FIG. 4). Moreover, the 2-input mux 602 of FIG. 6 is replaced with a 3-input mux 802A, like the 3-input mux 402A of FIG. 4. Consistent with FIG. 4, the third input of mux 802A is denoted input 2 and is coupled to receive a bypass bus signal 709A that is coupled to a signal 601B, which serves the same function as signal 601A but with respect to core 2 706C and core 3 706D, as discussed below. The select input to mux 802A is denoted 807A and operates to cause mux 802A to select its inputs as indicated in Table 6 below.

TABLE 6

| entity driving processor bus | input selected |
|---|---|
| chipset | 0 (signal 208A from external processor bus 142) |
| core 0 or core 1 | 1 (signal 601A from driving core 0 or core 1 of native twin core pair) |
| core 2 or core 3 | 2 (bypass bus signal 709A from driving core 2 or core 3 of complementary twin core pair) |

The bus interface circuitry 800 of FIG. 8 also includes for core 2 706C and core 3 706D essentially a mirror copy of the bus interface circuitry just described above for core 0 706A and core 1 706B. That is, for core 2 706C and core 3 706D, the bus interface circuitry 800 includes a physical pad 108B coupled to a pin 112 of the external processor bus 142. The physical pad 108B is also coupled to signal 208B which is coupled to the drain of transistor 204B whose source is coupled to ground. The transistor 204B is configured to receive on its gate input an output 601B of a two-input OR gate 603B. The OR gate 603B receives on its respective inputs signal 206C from core 2 706C and signal 206D from core 3 706D, which are similar to corresponding signals 206A and 206B of core 0 706A and core 1 706B. The bus interface circuitry 800 also includes a 3-input mux 802B that receives signal 208B on its input denoted input 0, receives signal 601B on its input denoted input 1, and receives bypass bus signal 709B on its input denoted input 2. Bypass bus signal 709B is coupled to signal 601A. The select input to mux 802B is denoted 807B and operates to cause mux 802B to select its inputs as indicated in Table 7 below.

TABLE 7

| entity driving processor bus | input selected |
|---|---|
| chipset | 0 (signal 208A from external processor bus 142) |
| core 0 or core 1 | 2 (bypass bus signal 709B from driving core 0 or core 1 of complementary twin core pair) |
| core 2 or core 3 | 1 (signal 601B from driving core 2 or core 3 of native twin core pair) |

The output of mux 802B is provided as an input signal 205A to core 2 706C and as an input signal 205D to core 3 706D. Input signals 205C and 205D are similar to corresponding signals 205A and 205B of core 0 706A and core 1 706B.

As may be observed from FIG. 8, advantageously, when core 0 306A or core 1 706B drives the processor bus 142, core 2 706C or core 3 706D may observe the values driven by core 0 306A or core 1 706B directly from the internal bypass bus 709B rather than from the external processor bus 142 via signal 208B, which has much poorer signal quality than the internal bypass bus signals 709B; and, when core 2 706C or core 3 706D drives the processor bus 142, core 0 306A or core 1 706B may observe the values driven by core 2 706C or core 3 706D directly from the internal bypass bus 709A rather than from the external processor bus 142 via signal 208A, which has much poorer signal quality than the internal bypass bus signals 709A.

It should be understood that when the term "signal" is used herein to refer to a circuit element, the term is used to refer to a wire over which a digital electrical signal may be conveyed.

Although dual-core and quad-core embodiments have been described that include an internal bypass bus to improve the signal quality with respect to processor bus signals, other embodiments are contemplated in which the multi-core microprocessor includes more than 4 cores, such as 6-core or 8-core embodiments.

Moreover, while embodiments have been described in which inter-core communication lines are provided from each core or twin core pair output ultimately coupled to the processor bus and a corresponding core or twin core pair input of a complementary core or twin core pair, and in both directions, other embodiments are contemplated in which inter-core communication lines are provided only from one core or twin core pair to the other, but not vice versa. Also, other embodiments are contemplated in which inter-core communication lines are provided only for select processor bus inputs and outputs.

It will be understood that while all of the inter-core communication wires depicted herein are collectively referred to as a "bypass bus," each set of inter-core communication wires going from one core or twin core pair to the other may be characterized as a distinguishable "bypass bus." Moreover, a collection of two or more such discretely characterized sets, including the combination of a set going in one direction (from a first core to a second core) with a set going in the opposite direction (e.g., from the second core to the first core), may be characterized either in the singular as a "bypass bus" or in the plural as "bypass buses."

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:
1. A microprocessor, comprising:
 a plurality of physical pins for coupling the microprocessor to a bidirectional processor bus coupled to a chipset, the processor bus comprising data and address lines;
 a die having a plurality of processing cores, each core having a bus interface coupling respective inputs and outputs of the core to corresponding bidirectional lines of the processor bus; and
 a bypass bus on the die that enables at least first and second complementary cores of the die to bypass the processor bus in order to communicate directly with each other, the bypass bus providing bus lines corresponding to all of the data and address lines of the processor bus;
 wherein the bypass bus does not carry signals off the die, drive signals on the processor bus to the chipset, or receive chipset-driven signals from the processor bus;
 wherein when the first core drives values on the processor bus to the chipset, the bus interface of the second core causes the second core to observe the values driven by the first core directly from the bypass bus rather than from the processor bus; and
 wherein when the second core drives values on the processor bus to the chipset, the bus interface of the first core causes the first core to observe the values driven by the second core directly from the bypass bus rather than from the processor bus.

2. The microprocessor of claim 1, wherein the bypass bus comprises wire nets disposed on the die and configured to convey a plurality of output signals from the first core to corresponding inputs of the second core, and a plurality of output signals from the second core to corresponding inputs of the first core.

3. The microprocessor of claim 2, wherein for each processor bus line of a plurality of processor bus lines to which the first and second cores are coupled, corresponding bus bypass lines are provided to connect the first and second cores together.

4. The microprocessor of claim 3, wherein for each processor bus line of the plurality of processor bus lines coupled to the first and second cores, a corresponding first unidirectional bypass bus line is provided going from the first core to the second core, and a corresponding second unidirectional bypass line is provided going from the second core to the first core.

5. The microprocessor of claim 1, wherein each bypass bus line has input and output ends coupled to corresponding bus interface logic of the first and second cores.

6. The microprocessor of claim 5, wherein, for each processor bus line of a plurality of processor bus lines coupled to the first and second cores, the core provides bus interface logic that receives, as a respective input, an output of a bus line interface multiplexer that receives, among the multiplexer's selectable inputs, the processor bus line and an output end of a corresponding bypass bus line from the complementary core.

7. The microprocessor of claim 6, wherein the bus line interface multiplexer receives a control input corresponding to whether the chipset, or a complementary core, is driving the processor bus.

8. The microprocessor of claim 7, wherein the core providing the bus line interface multiplexer is:
operable to detect, through analysis of signals on the processor bus, whether the chipset, or a complementary core, is driving the processor bus; and
configured to provide a corresponding control input to its bus line interface multiplexers.

9. The microprocessor of claim 6, wherein, for each processor bus line of a plurality of processor bus lines coupled to the first and second cores, the bus interface logic also comprises a bus line interface transistor for driving a core signal onto a processor bus line, wherein an input end of a corresponding bypass bus line is coupled directly to a core-driven output signal line gating the bus line interface transistor.

10. The microprocessor of claim 5, wherein each bypass bus line has input and output ends and is connected, on its input end, to the gate of a corresponding bus line interface transistor of one of the first and second cores, and on its output end, to an input of a corresponding bus line interface multiplexer of the other of the first and second cores.

11. A microprocessor, comprising:
a die having at least two cores and at least two sets of physical input/output landing pads, pairs of corresponding ones of said sets of landing pads coupling the microprocessor to a bidirectional processor bus coupled to a chipset, the processor bus comprising data and address lines;
bus interfaces coupling respective inputs and outputs of each core to corresponding physical input/output landing pads of the die; and
a bypass bus on the die that enables at least first and second complementary sets of die cores to bypass the processor bus in order to communicate directly with each other, the bypass bus providing bus lines corresponding to all of the data and address lines of the processor bus;
wherein the bypass bus does not carry signals off the die, drive signals on the processor bus to the chipset, or receive chipset-driven signals from the processor bus;
wherein when the first set of die cores drives values on the processor bus to the chipset, the bus interfaces cause the second set of die cores to observe the values driven by the first set of die cores directly from the bypass bus rather than from the processor bus; and
wherein when the second set of die cores drives values on the processor bus to the chipset, the bus interfaces cause the first set of die cores to observe the values driven by the second set of die cores directly from the bypass bus rather than from the processor bus.

12. The microprocessor of claim 11, wherein each of the first and second complementary sets of die cores comprise a pair of twin cores that share a corresponding set of physical input/output landing pads of the die.

13. The microprocessor of claim 12, wherein for each processor bus line of a plurality of processor bus lines to which the first and second complementary sets of cores are coupled, corresponding bus bypass lines are provided to connect the first and second complementary sets of cores together.

14. The microprocessor of claim 13, wherein for each processor bus line of the plurality of processor bus lines coupled to the complementary sets of first and second cores, a corresponding first unidirectional bypass bus line is provided going from the first complementary set to the second complementary set, and a corresponding second unidirectional bypass line is provided going from the second complementary set to the first complementary set.

15. The microprocessor of claim 11, wherein each bypass bus line has input and output ends coupled to corresponding bus interface logic of the first and second complementary sets of cores.

16. The microprocessor of claim 15, wherein, for each processor bus line of a plurality of processor bus lines coupled to corresponding sets of first and second cores, the cores of the corresponding set provides bus interface logic that receives, as a respective input, an output of a bus line interface multiplexer that receives, among the multiplexer's selectable inputs, the processor bus line and an output end of a corresponding bypass bus line from the complementary core.

17. The microprocessor of claim 16, wherein the bus line interface multiplexer receives a control input corresponding to whether the chipset, or a core of a complementary set of cores, is driving the processor bus.

18. The microprocessor of claim 17, wherein one of the cores of the set of cores providing the bus line interface multiplexer is:
operable to detect, through analysis of signals on the processor bus, whether the chipset, or a core of a complementary set of cores, is driving the processor bus; and
configured to provide a corresponding control input to its bus line interface multiplexers.

19. The microprocessor of claim 16, wherein, for each processor bus line of a plurality of processor bus lines coupled to the first and second complementary sets of cores, the bus interface logic also comprises a bus line interface transistor for driving a core signal onto a processor bus line, wherein an input end of a corresponding bypass bus line is coupled directly to a core-driven output signal line gating the bus line interface transistor, wherein the core-driven output signal line is a Boolean OR of output signal lines of the cores of corresponding complimentary set of cores.

20. The microprocessor of claim 15, wherein each bypass bus line has input and output ends and is connected, on its input end, to the gate of a corresponding bus line interface transistor of one of the complementary sets of cores, and on its output end, to an input of a corresponding bus line interface multiplexer of the other of complementary sets of cores.

21. A method of inter-core communication among cores of a multi-core die, the method comprising:
    receiving, on a bus interface of a core, both signals from a processor bus connecting the multi-core die to a chipset and signals from a corresponding bypass bus connecting the core to a complementary, bypass-bus-connected core of the multi-core die, wherein the bypass bus does not carry signals off the die, drive signals on the processor bus to the chipset, or receive chipset-driven signals from the processor bus, and wherein the processor bus comprises data and address lines and the bypass bus provides bus lines corresponding to all of the data and address lines of the processor bus;
    detecting whether the processor bus is being driven by the chipset or the complementary core; and
    if the processor bus is being driven by the complementary core, causing the bus interface to select signals from the bypass bus instead of signals from the processor bus to drive corresponding core inputs.

22. A method of inter-core communication among cores of a multi-core die, the method comprising:
    receiving, on a bus interface shared by a set of twin cores of the die, both a first set of signals from a processor bus connecting the multi-core die to a chipset and a second set of signals from a corresponding bypass bus connecting the set of twin cores to a complementary, bypass-bus-connected set of twin cores of the multi-core die, wherein the first and second sets of signals represent the same values, wherein the bypass bus does not carry the second set of signals off the die, drive the second set of signals on the processor bus to the chipset, or receive chipset-driven signals from the processor bus, and wherein the processor bus comprises data and address lines and the bypass bus provides bus lines corresponding to all of the data and address lines of the processor bus;
    detecting whether the processor bus is being driven by the chipset or a core of the complementary set of twin cores; and
    if the processor bus is being driven by a core of the complementary set of twin cores, causing the bus interface to select the second set of signals from the bypass bus instead of the first set of signals from the processor bus to drive corresponding core inputs.

* * * * *